US009273259B2

(12) United States Patent
Sunkara et al.

(10) Patent No.: US 9,273,259 B2
(45) Date of Patent: *Mar. 1, 2016

(54) STABILIZED FLUIDS FOR INDUSTRIAL APPLICATIONS

(71) Applicant: E I DU PONT DE NEMOURS AND COMPANY, Wilmington, DE (US)

(72) Inventors: Hari Babu Sunkara, Hockessin, DE (US); Raja Hari Poladi, Bear, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/203,643

(22) Filed: Mar. 11, 2014

(65) Prior Publication Data

US 2014/0274824 A1    Sep. 18, 2014

Related U.S. Application Data

(60) Provisional application No. 61/792,363, filed on Mar. 15, 2013.

(51) Int. Cl.
*C10M 133/08* (2006.01)
*C10M 133/14* (2006.01)
(Continued)

(52) U.S. Cl.
CPC ............... *C10L 1/2235* (2013.01); *C08K 5/17* (2013.01); *C08K 5/18* (2013.01); *C10L 1/1824* (2013.01); *C10L 10/00* (2013.01); *C10M 127/04* (2013.01); *C10M 129/94* (2013.01); *C10M 133/08* (2013.01); *C10M 141/06* (2013.01); *C10M 169/04* (2013.01); *H01B 3/20* (2013.01); *C10L 1/188* (2013.01); *C10M 2215/042* (2013.01)

(58) Field of Classification Search
CPC ...... C10L 1/2235; C10L 1/1824; C10L 10/00; C10L 1/188; C10M 169/04; C10M 141/06; C10M 127/04; C10M 129/94; C10M 133/08; C10M 2215/042; C08K 5/18; C08K 5/17; H01B 3/20
USPC .................................. 508/107, 243, 545, 553
See application file for complete search history.

(56) References Cited

U.S. PATENT DOCUMENTS 2,696,427 A    12/1954    Biswell
2,755,175 A    7/1956    Fareri
(Continued)

FOREIGN PATENT DOCUMENTS

EP    2500402 A1    9/2012

OTHER PUBLICATIONS

Eic Structure Search with Utility Limitation Query Jul. 2015.*
(Continued)

*Primary Examiner* — Pamela H Weiss

(57) ABSTRACT

The present invention is directed toward compositions suitable for use as dielectric fluids, lubricant fluids and biodiesel fluids. Compositions described herein are obtained from a saturated, unsaturated or combinations of both monol, diol, triol or polyol acyl ester based fluid and/or a non-ester based fluid and 2,4,6-tris(di-$C_1$-$C_6$-alkylaminomethyl) phenol and/or the carboxylic acid salt of 2,4,6-tris(di-$C_1$-$C_6$-alkylaminomethyl) phenol. These compositions demonstrate improved oxidative stability and/or hydrolytic stability at higher use temperatures.

13 Claims, 7 Drawing Sheets

(51) Int. Cl.
*C10M 141/02* (2006.01)
*C10M 141/06* (2006.01)
*C10L 1/223* (2006.01)
*H01B 3/20* (2006.01)
*C10M 129/94* (2006.01)
*C10L 10/00* (2006.01)
*C10M 169/04* (2006.01)
*C10L 1/182* (2006.01)
*C08K 5/17* (2006.01)
*C08K 5/18* (2006.01)
*C10M 127/04* (2006.01)
*C10L 1/188* (2006.01)

(56) References Cited

U.S. PATENT DOCUMENTS

| | | | |
|---|---|---|---|
| 6,312,623 B1 * | 11/2001 | Oommen et al. | 252/579 |
| 6,410,490 B1 * | 6/2002 | Reyes-Gavilan et al. | 508/243 |
| 7,048,875 B2 * | 5/2006 | Oommen et al. | 252/579 |
| 2009/0094887 A1 | 4/2009 | Calvert et al. | |
| 2014/0264199 A1 * | 9/2014 | Sunkara et al. | 252/573 |
| 2014/0274846 A1 * | 9/2014 | Sunkara et al. | 508/495 |

OTHER PUBLICATIONS

International Search Report dated Oct. 8, 2014, International Application No. PCT/US2014/025443.

* cited by examiner

US 9,273,259 B2

STABILIZED FLUIDS FOR INDUSTRIAL APPLICATIONS

This application claims benefit of priority from U.S. Provisional Application No. 61/792,363 which is herein incorporated by reference in its entirety.

FIELD OF THE INVENTION

This invention relates to compositions suitable for use as dielectric fluids, lubricant fluids and biodiesel fluids.

BACKGROUND

High performance fluids for industrial applications can include ester based fluids or non-ester based fluids or combinations of ester and non-ester based fluids.

Ester based fluids, both natural and synthetic, have long been used globally in a wide range of industrial applications as base oils that include dielectric fluids, lubricant fluids, biodiesel fluids, etc. Synthetic esters are obtained from an alcohol, having one, two, three or more hydroxyl groups, wherein the alcohol is esterified with a carboxylic acid or acid mixture. Natural esters are triglycerides of vegetable oil, algae oil or animal fats. Triglycerides are considered the esterification product of glycerol, a triol, with three molecules of fatty acids. Vegetable oils are biodegradable, nontoxic and renewably sourced, unlike conventional mineral oils. They have low volatility, high flash and fire points and good boundary lubrication properties. However, the major drawbacks of vegetable oils are their poor oxidative stability, poor hydrolytic stability and unfavorable rheological fluid properties at low temperatures which severely limit their use in industrial applications mentioned below.

Dielectric fluids are used in the electrical industry for cooling electrical equipment such as transformers, power cables, breakers and capacitors. Typically, these dielectric fluids are used in combination with solid insulation such as in liquid-filled transformers. Examples of dielectric fluids include mineral oil, high molecular weight hydrocarbons (HMWH), silicone fluid, and synthetic hydrocarbon oils (polyalpha-olefins). Such fluids must be electrically insulating, resistant to degradation, and be able to act as a heat transfer medium so that the high amount of heat generated in an electrical apparatus can be dissipated to the surrounding environment and thereby increase the life of the solid insulation.

Lubricant fluids are used as hydraulic fluids, metal working fluids, 2-cycle engine oil, process oils, chain bar oils, and greases. A lubricant fluid is typically formulated by combining a lubricant base stock, or a mixture of lubricant base stocks, with additives and other optional formulation aids. Esters of monols, diols, triols and polyols are frequently used.

Biodiesel fluids are used in primarily three markets, mass transit, marine industry and in farming. Biodiesel fluids are made from vegetable and animal oils. Biodiesel fluids offers a number of advantages over petrodiesel fuels such as enhanced biodegradation, increased flash point, reduced toxicity, lower emissions and increased lubricity. When biodiesel fluids are blended with diesel fuels, the blend has better properties. Since the biodiesel fluid has the same fatty acid profile as the parent oil or fat, its stability behavior is similar to that of its parent oil and faces similar technical issues such as its susceptibility to oxidation upon exposure to oxygen in ambient air and hydrolysis upon exposure to moisture.

As mentioned above non-ester based fluids such as mineral oil, high molecular weight hydrocarbons (HMWH), silicone fluid, and synthetic hydrocarbon oils (polyalpha-olefins) can be used as dielectric fluids. However, these fluids are not as environmentally friendly materials as ester fluids.

Additives are often added to enhance the performance of base fluids.

There is a need for an additive to improve the fluid stability of dielectric fluids, lubricant fluids and biodiesel fluids by improving the oxidative stability and hydrolytic stability of the fluids, preferably at elevated use temperatures.

SUMMARY

The present invention is directed toward a stabilized aminophenolic composition comprising: (a) a 2,4,6-tris(di-$C_1$-$C_6$-alkylaminomethyl) phenol (TAP); and (b) at least one component selected from the group consisting of: (i) an ester based fluid comprising esters of mono-, di-, tri- or polyhydroxyl alcohols; and (ii) at least one mono $C_{12}$-$C_{30}$ carboxylic fatty acid in a molar ratio of up to 3 moles of mono $C_{12}$-$C_{30}$ carboxylic fatty acid per mole of TAP such that a salt is formed from the mono $C_{12}$-$C_{30}$ carboxylic fatty acid and the TAP; and wherein the stabilized aminophenolic composition is characterized in that the stabilized aminophenolic composition has improved stability relative to the TAP alone and the improved stability being demonstrated by at least one of the following performance metrics wherein: (aa) an extrapolated onset of thermal decomposition of the TAP in the stabilized aminophenolic composition occurs at a higher temperature than the extrapolated onset of thermal decomposition of the substantially pure TAP as measured by thermogravimetric analysis (TGA) ASTM E2402-11; and (bb) the stabilized aminophenolic composition has an oxidative stability index (OSI) of greater than about 20 hours at 130° C. as measured by AOCS 12b-92.

In another embodiment, the present invention is directed toward a stabilized dielectric fluid composition comprising: (a) at least one component selected from the group consisting of: (i) an ester based fluid comprising saturated and/or unsaturated esters of mono-, di-, tri- or polyhydroxyl alcohols; and (ii) a non-ester based fluid selected from the group consisting of mineral oil, silicones, poly(alpha olefins) and combinations thereof; and (b) at least one component selected from the group consisting of: (i) a 2,4,6-tris(di-$C_1$-$C_6$-alkylaminomethyl) phenol (TAP); and (ii) a salt of a at least one mono $C_{12}$-$C_{30}$ carboxylic fatty acid and a TAP having a molar ratio of up to 3 moles of mono $C_{12}$-$C_{30}$ carboxylic fatty acid per mole of TAP; and characterized in that the stabilized dielectric fluid composition has an oxidative stability index (OSI) of greater than about 20 hours at 130° C. as measured by AOCS 12b-92.

In another embodiment, the present invention is directed toward a stabilized lubricant fluid composition comprising: (a) at least one component selected from the group consisting of: (i) an ester based fluid comprising saturated and/or unsaturated esters of mono-, di-, tri- or polyhydroxyl alcohols; and (ii) a non-ester based fluid selected from the group consisting of mineral oil, silicones, poly(alpha olefins) and combinations thereof; (b) at least one component selected from the group consisting of: (i) 2,4,6-tris(di-$C_1$-$C_6$-alkylaminomethyl) phenol (TAP); and (ii) a salt of a at least one mono $C_{12}$-$C_{30}$ carboxylic fatty acid and TAP having a molar ratio of up to 3 moles of mono $C_{12}$-$C_{30}$ carboxylic fatty acid per mole of TAP; and (c) at least one additive selected from the group consisting of antioxidant, antiwear, antisieze and pour point depressant; and wherein the stabilized lubricant fluid composition has an oxidative stability index (OSI) of greater than about 20 hours at 130° C. as measured by AOCS 12b-92.

In still another embodiment, the present invention is directed toward a stabilized biodiesel fluid composition comprising: (a) a methyl ester based fluid selected from the group consisting of vegetable oil, algae oil, animal fat, tall oil and combinations thereof; (b) optionally, a petrodiesel fluid; and (c) at least one component selected from the group consisting of: (i) 2,4,6-tris(di-$C_1$-$C_6$-alkylaminomethyl) phenol (TAP); and (ii) a salt of a at least one mono $C_{12}$-$C_{30}$ carboxylic fatty acid and TAP having a molar ratio of up to 3 moles of mono $C_{12}$-$C_{30}$ carboxylic fatty acid per mole of TAP; and wherein the composition is characterized in that the stabilized biodiesel fluid composition has an oxidative stability index (OSI) of greater than about 10 hours at 110° C. as measured by AOCS 12b-92.

DETAILED DESCRIPTION

Definitions

Figure 1A:
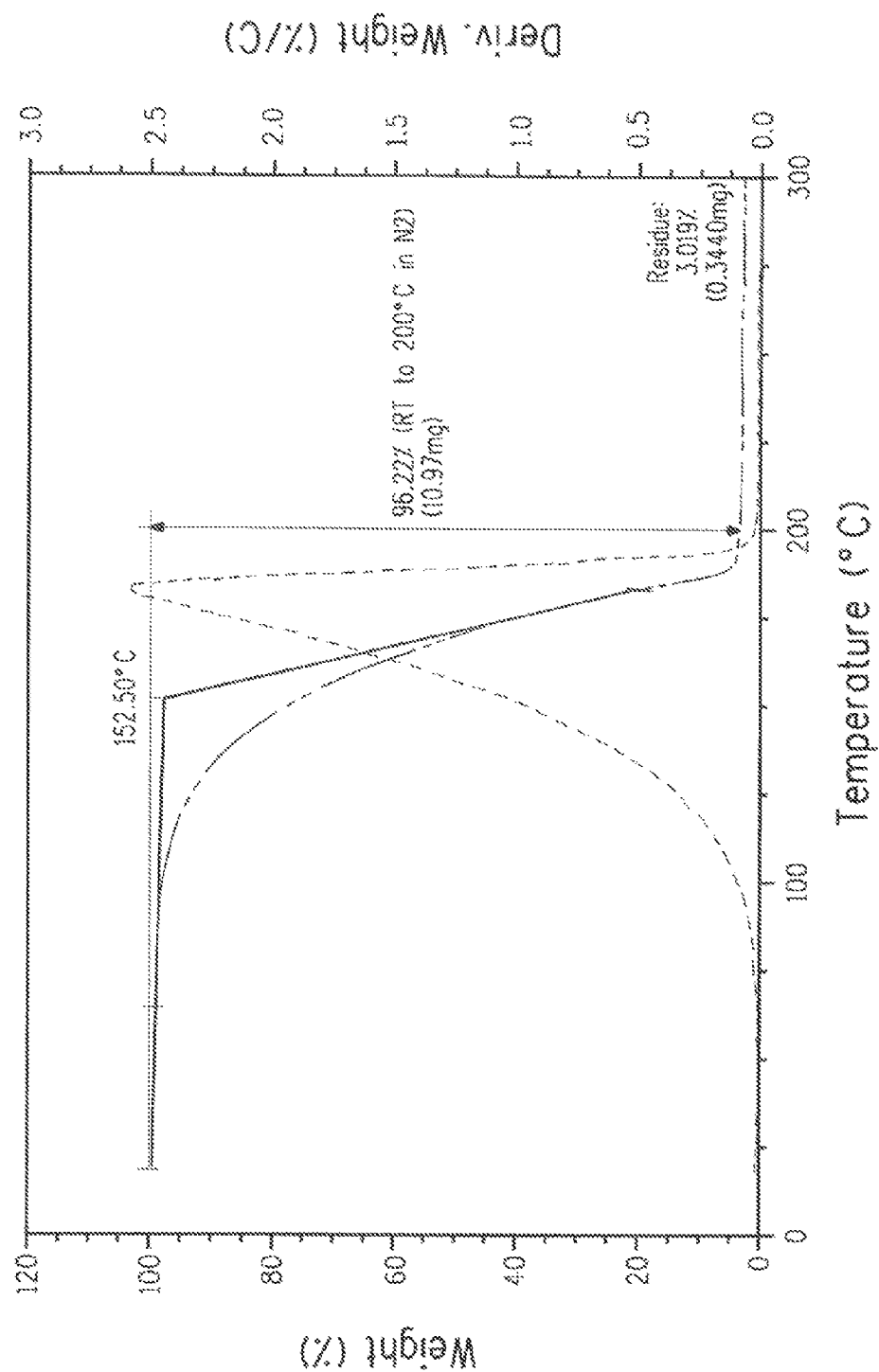
FIG. 1a is a percent weight loss graph of the thermal gravimetric analysis (TGA) of TDAMP as a function of temperature.

DAMP is dimethylaminomethyl phenol.
DBDAMP is 2,6-di-t-butyl-4-dimethylaminomethyl phenol.
BDAMP is 2,4-bis(dimethylaminomethyl) phenol.
TDAMP is 2,4,6-tris(dimethylaminomethyl) phenol.
TDAMP-TEH is 2-ethylhexanoic acid salt of TDAMP.
TAP is 2,4,6-tris(di-$C_1$-$C_6$-alkylaminomethyl) phenol.
ADPA is alkylated diphenylamine.
BHT is butylated hydroxytoluene.
BHA is butylated hydroxyanisole.
TBHQ is t-butylhydroquinone.
HMBBHC is 1,6-hexamethylenebis(3,5-t-butyl-4-hydroxyhydrocinnamate).
TTCC is trimethylolpropane tricaprylic-caprate.
SME is soybean methyl ester.
HOS oil is high oleic soybean oil.
HOME is high oleic soybean methyl ester.

The stabilized compositions of the present invention comprise an ester based fluid selected from vegetable (plant) oil, algae, animal fat and tall oil fatty acid esters and 2,4,6-tris(di-$C_1$-$C_6$-alkylaminomethyl)phenol, and these compositions are useful in various industrial applications that include but not limited to dielectric fluids, lubricant fluids and fuel fluids. These compositions further comprise other synthetic saturated esters and/or non-ester based oils that include but not limited to mineral oil, silicones, polyalphaolefins, and diesel fluids.

2,4,6-tris(dimethylaminomethyl)phenol (TDAMP) is used widely as a delayed-action gelation catalyst for polyurethane rigid foam, and as a curing agent and as a tertiary amine activator for epoxy resins. TDAMP is available commercially as Ancamine K54 or DMP-30. Both DMP-30 and Ancamine K54 have 2,4,6-tris(dimethylamino)phenol as the main component and 2,6-bis(dimethylaminomethyl)phenol as the minor component.

Vegetable oils and animal fats have different structures and are more polar than mineral oils and therefore have different properties. The majority of vegetable oils consist primarily of triacylglycerides, also known as triglycerides. The fatty acids in the vegetable or plant oils can be saturated, unsaturated, conjugated or isolated and the unsaturation can be mono-unsaturated or poly-unsaturated. Different fatty acids have different levels of unsaturation and the degree of unsaturation can be measured by iodine value. Tall oil fatty acids refined from crude tall oil, a by-product of the pulp industry, could be used as a feedstock to make tall oil fatty acid ester compositions of the present invention. The tall oil fatty acids are predominantly consist of oleic and linoleic free fatty acids and these fatty acids can be converted into esters by reacting with monol, diols, triols and polyols.

The saturated, unsaturated or combination of both monol, diol, triol or polyol acyl ester based fluid is selected from the group consisting of a vegetable oil based fluid, algae oil, animal fat, tall oil and combinations thereof. The ester based fluid comprises free fatty acids up to about 1 wt %. An example of an animal fat is tallow oil. The vegetable oil based fluid is selected from the group consisting of soybean oil, rapeseed oil, sunflower oil, safflower oil, castor oil, palm oil, palm kernel oil, coconut oil, camelina oil, olive oil, cottonseed oil, grapeseed oil and combinations thereof. In one embodiment, the vegetable oil based fluid comprises at least about 75 wt % of a high oleic acid triglyceride composition comprising fatty acid components of at least about 75 wt % oleic acid. In another embodiment, the vegetable oil based fluid comprises a reaction product obtained from the transesterification of vegetable oil with alcohol.

Due to the presence of glycerol moiety, unsaturation groups and residual free fatty acids, the vegetable oils have lower thermo-oxidation stability than mineral oils. The presences of ester groups and residual free fatty acids in the vegetable oils make these oils susceptible to hydrolysis leading to the formation of carboxylic acids and alcohols. In many of the industrial applications, these oils can contact with metals such as iron and copper at elevated temperatures, and these metals can accelerate undesirable oxidation, hydrolysis and corrosion reactions in vegetable oils. The vegetable oils upon oxidation can result in increased acidity, corrosion, viscosity and volatility, and hence limit the useful life of vegetable oil based fluids.

Use of additives to enhance the stability of the vegetable oils is more cost effective than chemically modifying the oils. The effectiveness of additives is affected by several factors including the base oil composition, environmental conditions and the presence of other additives. As a result of structural differences, the additives that general work for mineral oils do not work very well for vegetable oils.

The thermo-oxidative stability of vegetable oils can be improved with phenolic antioxidants at much higher loadings than are used in mineral oils. However, the phenolic antioxidants being acidic in nature could accelerate the hydrolysis of esters when these oils are exposed to moisture at elevated temperature and thus make these oils less attractive in high temperature industrial applications. The known efficient diphenylamine antioxidants such Irganox® L-57 and Naugard® 445 when tested performed poorly in vegetable oils, in fact, functioned as pro-oxidants, at oxidation test temperatures of 110-130° C. However, the same antioxidants excelled in synthetic esters at the same temperature range. The major difference between the synthetic esters and vegetable oils is (poly) unsaturation. This observed pro-oxidant effect of diphenylamines is consistent with the reported data. It is interesting to note that the temperature effect of diphenylamine antioxidants in vegetable oils and their inefficiency at lower temperatures (below 175° C.) because the diphenylamines are expected to follow the basic radical scavenging mechanism as hindered phenolic antioxidants. Because of thermo-oxidative and hydrolysis instabilities, the temperature limit for vegetable oils is well below 100° C. and, therefore, these oils are limited to only low temperature industrial applications.

Figure 1B:
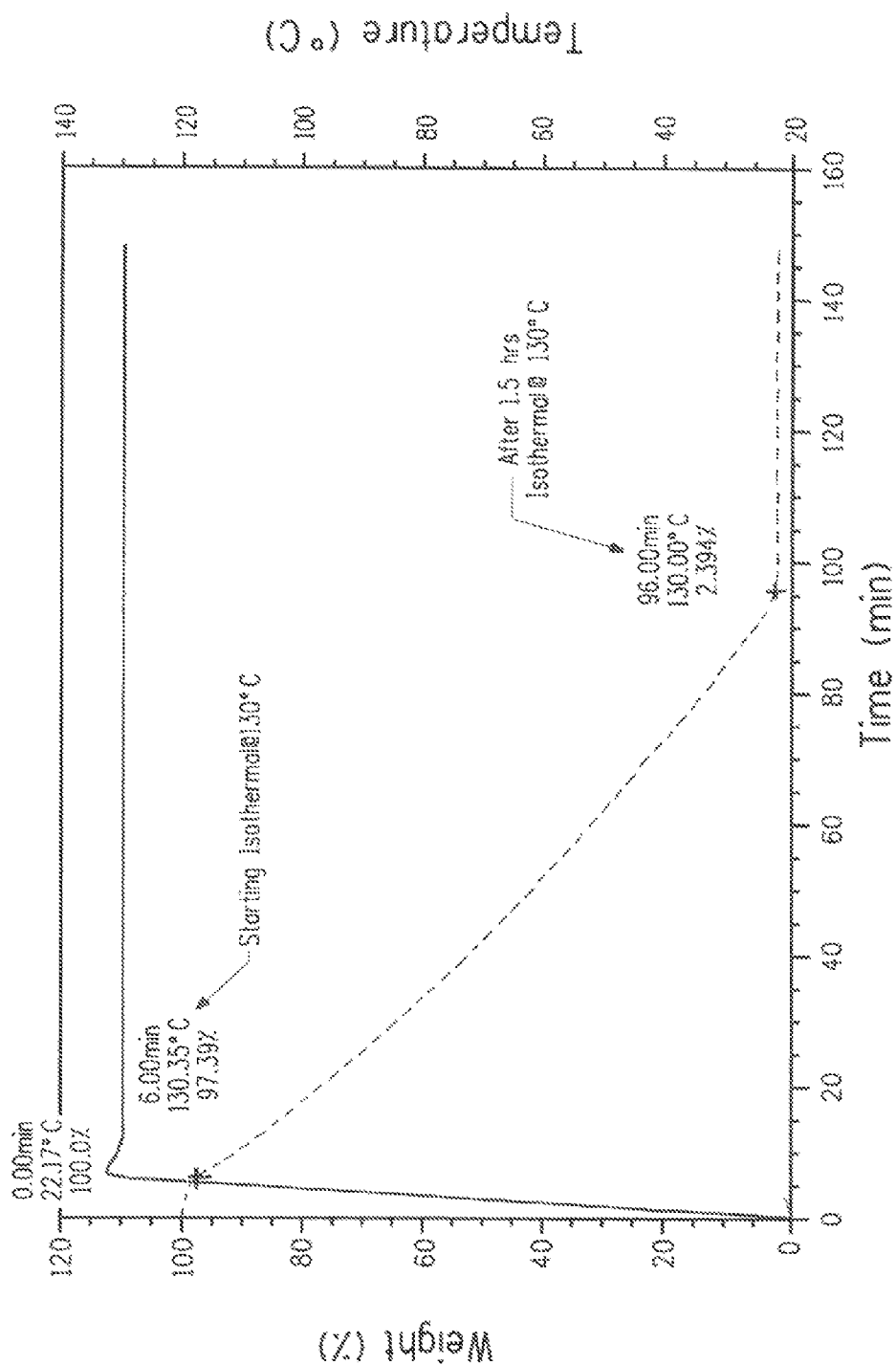
FIG. 1b is a percent weight loss graph of the TGA of TDAMP as function of time at a constant temperature.

Vegetable oils are thermally stable at high temperatures, but less stable thermo-oxidatively. Any additive that enhances thermo-oxidative stability of vegetable oils must be thermally stable so that the fluids could be used in broad range of temperatures. We have examined the thermal stability of the TDAMP for suitability of its use an additive to vegetable oils. The weight loss of neat TDAMP under inert atmosphere as a function of both temperature (heating rate at 5° C./min) and time was investigated (FIGS. 1a and 1b) by thermogravimetric analysis (TGA). The extrapolated onset decomposition temperature of TDAMP was 152.5° C. at which the weight loss begins (FIG. 1a) and this temperature agrees with the reported decomposition temperature of 156° C. in the prior art. The slight difference in the decomposition temperature is may be due to different heating rates. The first derivative peak temperature was about 185° C. The peak of the first derivative, also known as inflection point, indicates the point of greatest rate of change on the weight loss curve. At isothermal temperature of 130° C., the TDAMP decomposed by more than 97% in 1.5 hours (FIG. 1 b). Therefore, it is anticipated that this material could not survive in accelerated oxidative stability index tests conducted for vegetable oils at 130° C. Surprisingly, when we tested the thermo-oxidative stability of vegetable oils at 130° C., the induction period for high oleic soybean oil composition containing 0.2 wt % TDAMP was about 30 hours and the induction period for the high oleic soybean oil composition containing TDAMP along with other phenolic antioxidants was even much higher (about 100 hours) suggesting that the vegetable oils stabilize the TDAMP at these temperatures, and the stabilized TDAMP improves the oxidative stability of the vegetable oils. This is a rather surprising result because usually additives are added to enhance the performance of a base fluid, and in this case, the base fluids are enhancing the thermal performance of the TDAMP additive and in turn their thermo-oxidative stability was improved resulting in stabilized compositions.

Figure 2:
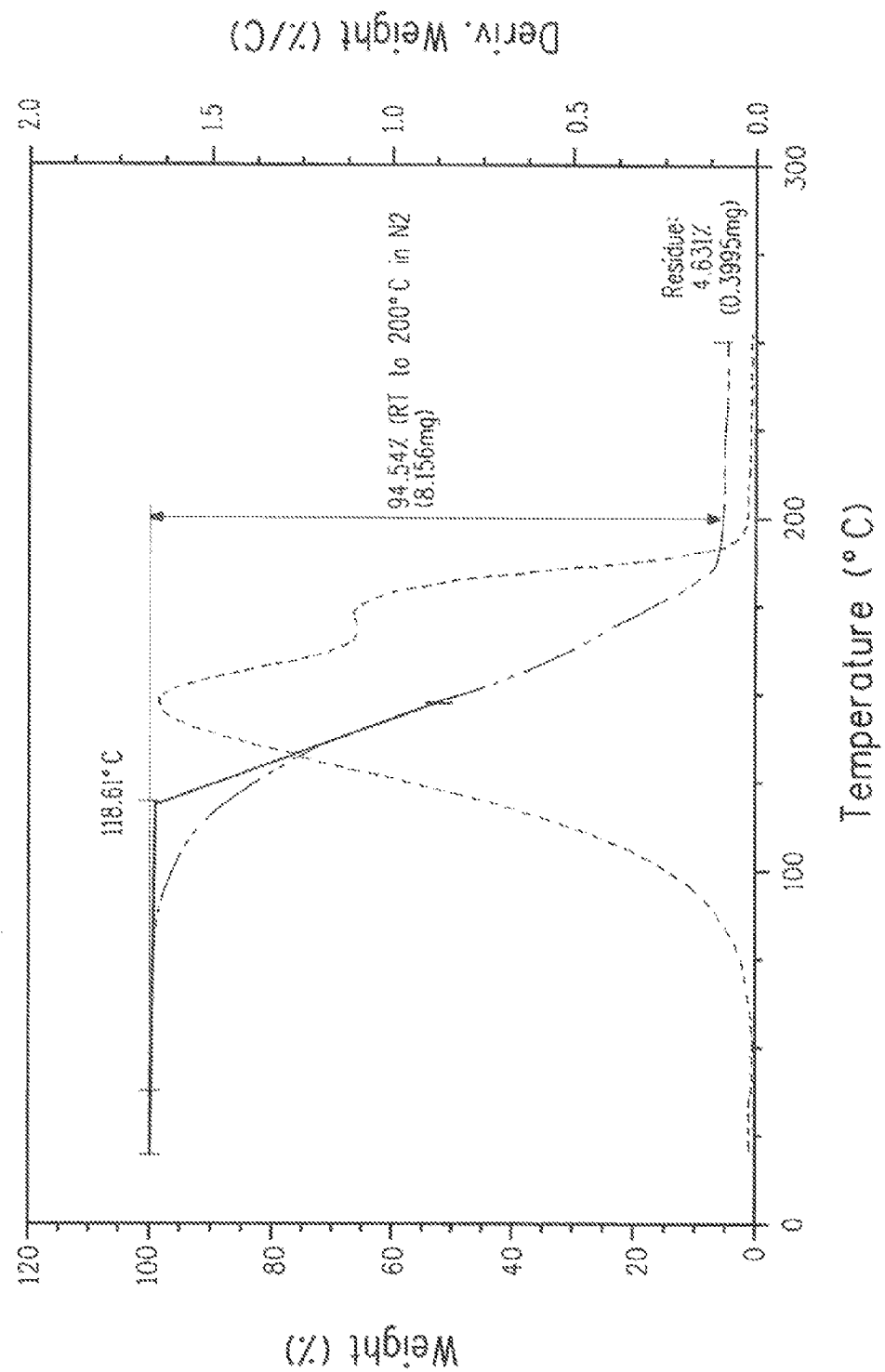
FIG. 2 is a graph of the TGA of 2-ethylhexanoic acid salt of TDAMP as a function of temperature.
Figure 3:
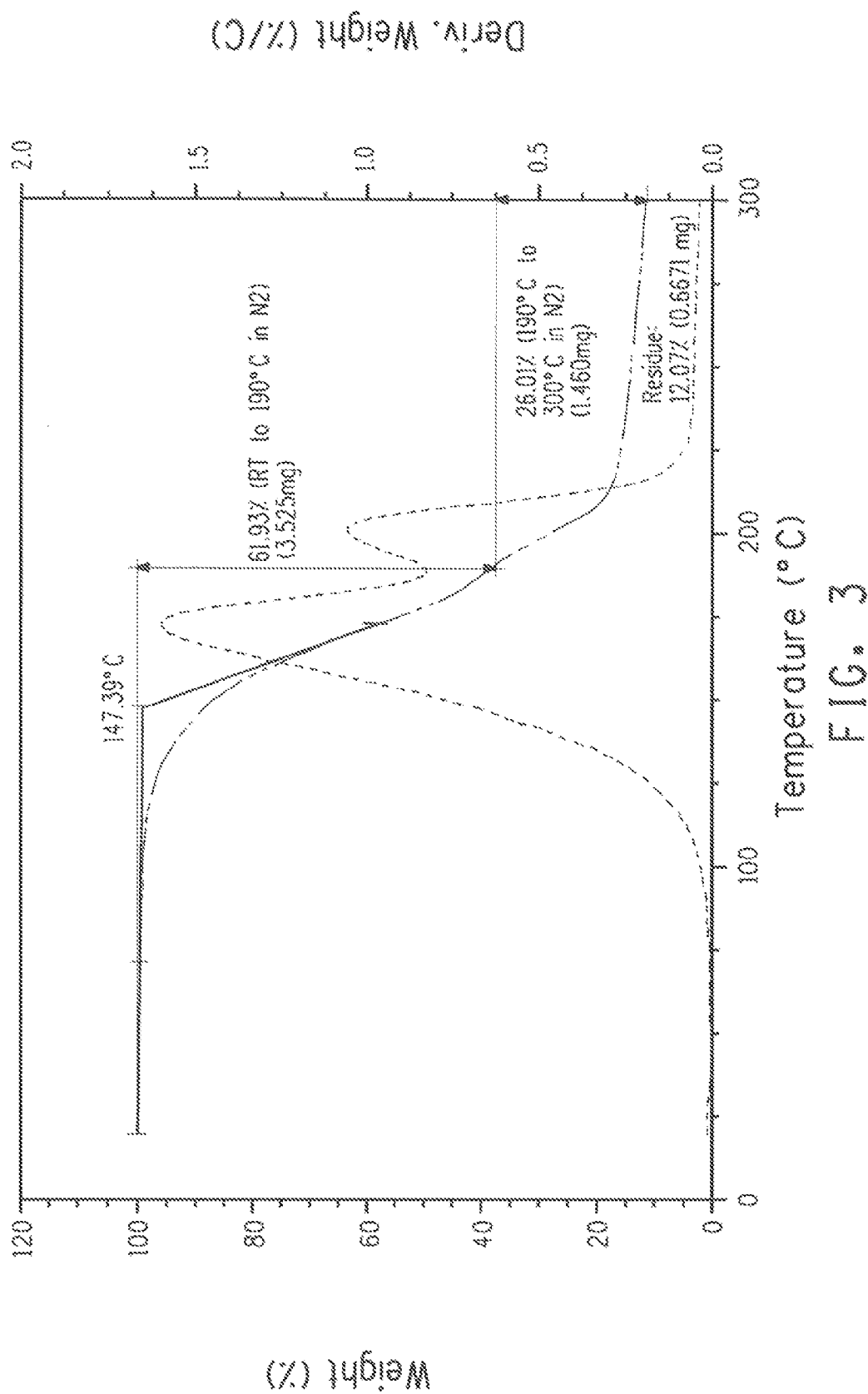
FIG. 3 is a graph of the TGA of lauric acid salt of TDAMP as a function of temperature.
Figure 4:
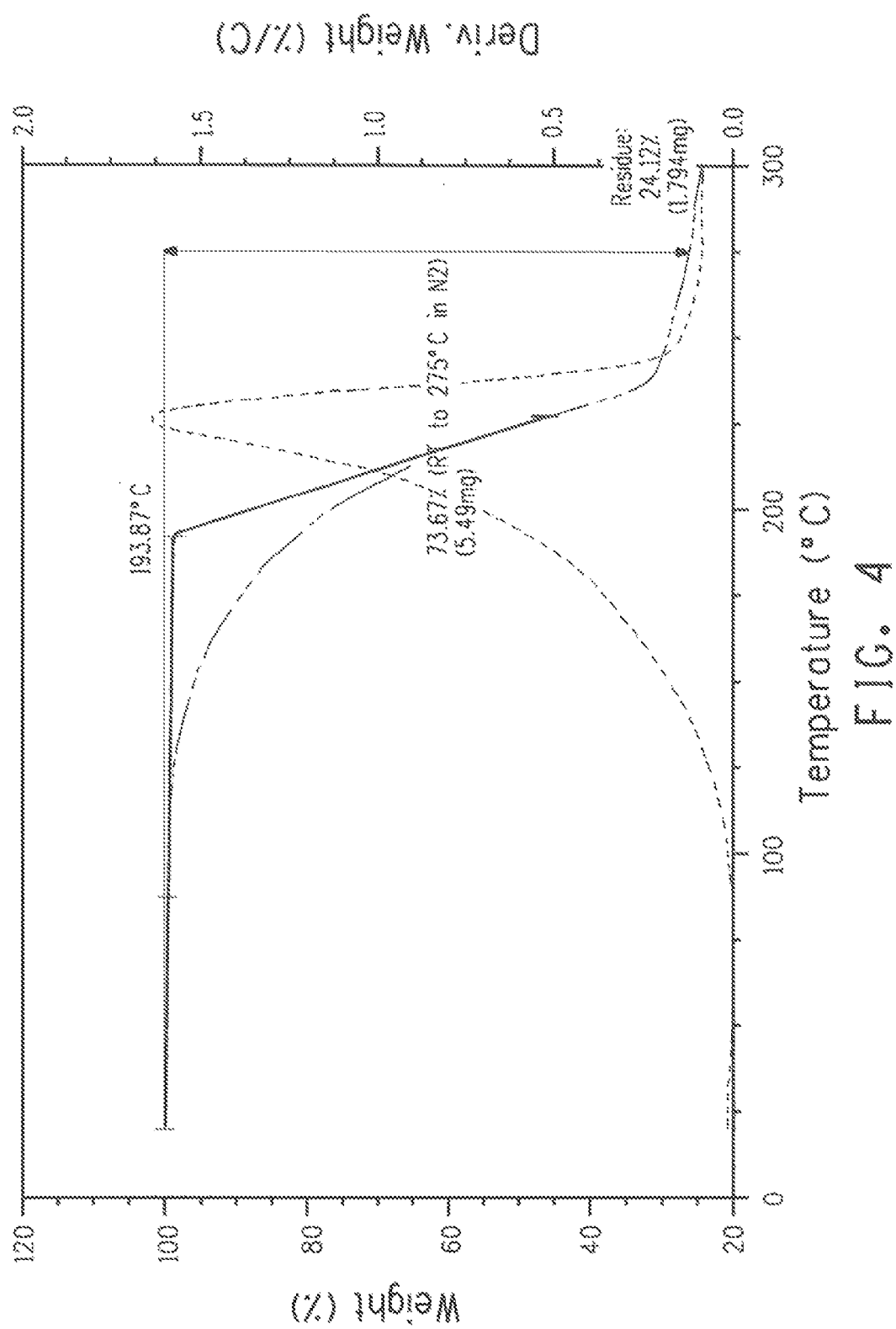
FIG. 4 is a graph of the TGA of oleic acid salt of TDAMP as a function of temperature.
Figure 5:
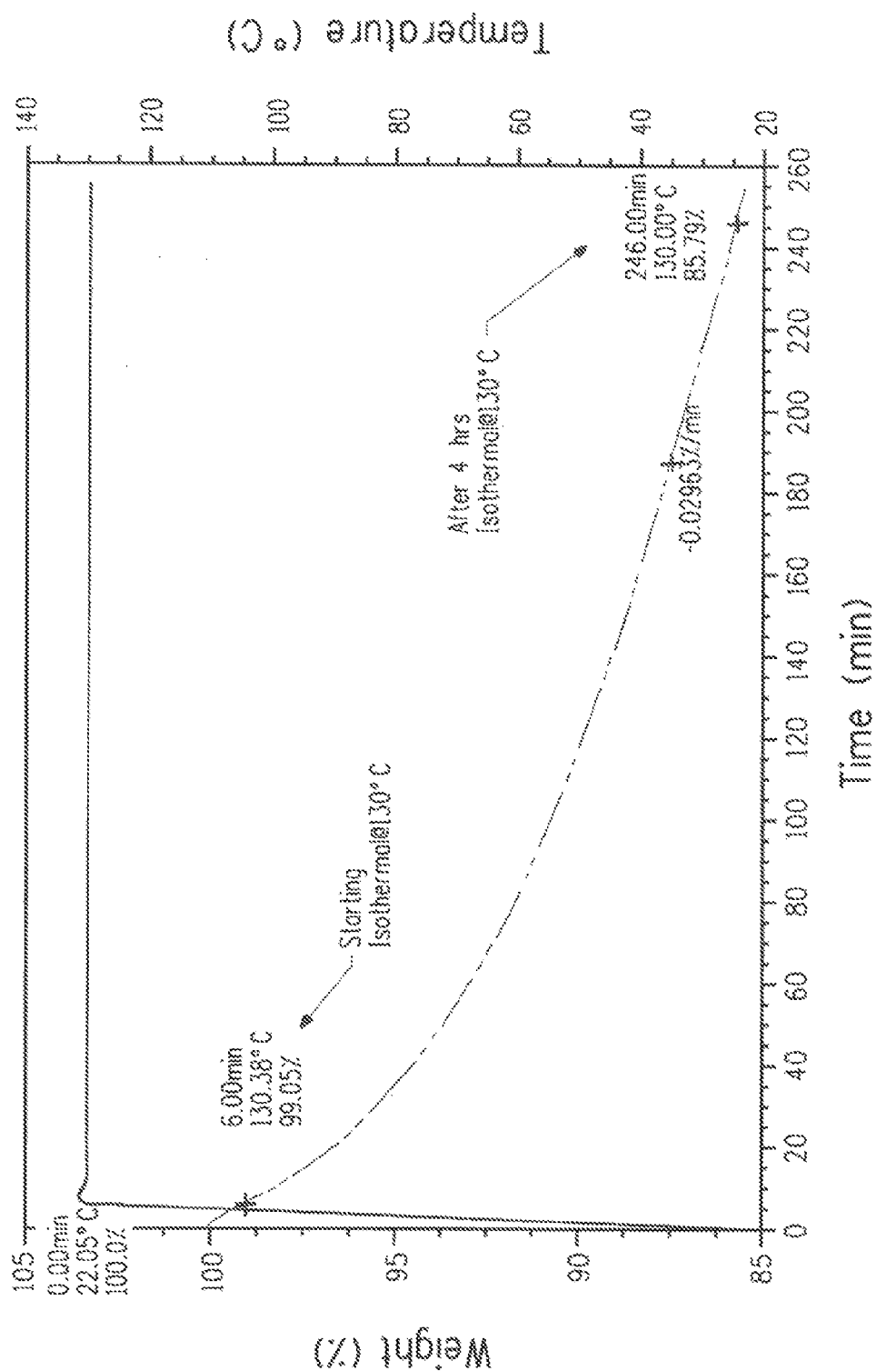
FIG. 5 is a graph of the TGA of oleic acid salt of TDAMP as a function of time at a constant temperature.

We have also prepared salts by reacting TDAMP with carboxylic acids including renewable sourced carboxylic acids. The selected carboxylic acids are: a branched C8 based (2-ethylhexanoic acid), a linear saturated C12 based (lauric acid) and a monounsaturated C18 based (oleic acid). Since the TDAMP has three tertiary amine groups, three moles of one or more carboxylic acid are needed for each mole of TDAMP to completely neutralize the base. If basicity is desired, less than 3 moles of one or more carboxylic acids can be added to one mole of TDAMP. The benefits associated with the use of salts are many folds that include higher thermal stability, greater solubility in oils, safer and less hazardous. The thermal stability of the carboxylic acid salts of TDAMP (completely neutralized) and their antioxidant efficiency were tested. The thermal stability of 2-ethylhexanoic acid salt of TDAMP (commercially available from Air Products) was tested. The weight loss of 2-ethylhexanoic acid salt as a function of temperature is shown in FIG. 2. A weight loss of 94.5% occurred at 200° C. with a 4.6% residue. The first derivative peaks indicate that the salt dissociates into corresponding amine and acid at elevated temperature, and the 2-ethylhexanoic acid volatilizes even before TDAMP decomposes. The lauric acid salt of TDAMP was prepared by reacting TDAMP with lauric acid. The renewably sourced lauric acid is a solid having melt ($T_m$) and recrystallization ($T_c$) temperatures 44 and 39° C. respectively as measured from differential scanning calorimetry (DSC), whereas, the carboxylic salt derived from TDAMP and lauric acid is a liquid at room temperature with a single melt temperature at −16° C. and a single recrystallization temperature of −24° C. indicating a homogeneous composition of the salt. The linear saturated lauric acid which is less volatile than the branched 2-ethylhexanoic acid, a lower weight loss with higher residue was observed with lauric acid salt compared to 2-ethylhexanoic acid salt as shown in FIG. 3. The first derivative peak associated with TDAMP shifted to higher temperature by about 20° C. indicating higher thermal stability of the lauric acid salt. In contrast to lauric acid salt, the oleic acid salt of TDAMP had no sharp melt and crystallization temperatures as evident from DSC (not shown) and therefore this salt has superior low temperature fluid properties. Unlike the other two acids, there was only one single first derivative peak observed for the oleic acid salt of TDAMP and this salt appears to be even more thermally stable than lauric acid salt as shown in FIG. 4. As shown in FIG. 5, the weight loss of this compound at isothermal temperature of 130° C. was about 9% in 1.5 hours and less than about 15% in 4 hours indicating much higher stability of TDAMP-oleic acid salt compared to TDAMP (FIG. 1b).

The antioxidant efficiency of these three carboxylic acid salts was tested by adding the salts to vegetable oils in accelerated Oxidation Stability Index (OSI) test at 130° C. Surprisingly, all of the three carboxylic salts showed similar efficiencies compared to TDAMP at equivalent moles despite the amine groups being neutralized completely. Even more surprisingly, the oleic acid salt, in spite of having unsaturation, showed good antioxidant efficiency.

The present invention is directed toward a stable composition suitable for use as a dielectric fluid, lubricant fluid or fuel fluid. The present invention is directed toward a stabilized aminophenolic composition comprising: (a) a 2,4,6-tris(di-$C_1$-$C_6$-alkylaminomethyl) phenol (TAP); and (b) at least one component selected from the group consisting of: (i) an ester based fluid comprising esters of mono-, di-, tri- or polyhydroxyl alcohols; and (ii) at least one mono $C_{12}$-$C_{30}$ carboxylic fatty acid in a molar ratio of up to 3 moles of mono $C_{12}$-$C_{30}$ carboxylic fatty acid per mole of TAP such that a salt is formed from the mono $C_{12}$-$C_{30}$ carboxylic fatty acid and the TAP; and wherein the stabilized aminophenolic composition is characterized in that the stabilized aminophenolic composition has improved stability relative to the TAP alone and the improved stability being demonstrated by at least one of the following performance metrics wherein: (aa) an extrapolated onset of thermal decomposition of the TAP in the stabilized aminophenolic composition occurs at a higher temperature than the extrapolated onset of thermal decomposition of the substantially pure TAP as measured by thermogravimetric analysis (TGA) ASTM E2402-11; and (bb) the stabilized aminophenolic composition has an oxidative stability index (OSI) of greater than about 20 hours at 130° C. as measured by AOCS 12b-92.

Also, the present invention is directed toward a method for stabilizing an aminophenolic composition comprising mixing together at or above ambient temperature: (a) a 2,4,6-tris (di-C1-C6-alkylaminomethyl) phenol (TAP); and (b) at least one component selected from the group consisting of: (i) an ester based fluid comprising esters of mono-, di-, tri- or polyhydroxyl alcohols; and (ii) at least one mono C12-C30 carboxylic fatty acid in a molar ratio of up to 3 moles of mono C12-C30 carboxylic fatty acid per mole of TAP such that a salt is formed from the mono C12-C30 carboxylic fatty acid and TAP; and whereby a stabilized aminophenolic composition of claim 1 is obtained.

Preferably, the fluid comprising the saturated, unsaturated or combinations of both monol, diol, triol or polyol acyl ester based fluid and/or the non-ester based fluid comprises from about 50 to about 99.995 wt % and more preferably from about 90 to about 99.995 wt % based on the weight of the composition. Preferably, the additive comprises from about 0.05 to about 3 wt %, more preferably from about 0.05 to about 2.5 wt % and most preferably from about 0.5 to about 2 wt % based on the weight of the composition. The carboxylic acid can react with one, two or all three reactive amine sites on the 2,4,6-tris(di-$C_1$-$C_6$-alkylaminomethyl) phenol.

In a preferred embodiment, the 2,4,6-tris(di-$C_1$-$C_6$-alkylaminomethyl) phenol is 2,4,6-tris(dimethylaminomethyl) phenol (TDAMP). The TDAMP is a tertiary amine having both phenolic and amine groups. TDAMP has multifunctional properties and by virtue of its multifunctionality it could enhance the performance of the fluids, in particular saturated/unsaturated ester fluids, by inhibiting oxidation, hydrolysis and corrosion. Besides, it also reacts with residual free fatty acids present in the natural or synthetic esters and also can react with acids that are generated during storage or aging and which makes the fluids more stable. It also interacts with acidic phenolic antioxidants and thereby reduces the impact of these acidic additives on ester hydrolysis.

It is surprising to see the ineffectiveness of a well-known alkylated diphenylamine antioxidant in vegetable oils including high oleic oils. It is unexpected to see the excellent antioxidant behavior of TDAMP and relatively poor efficiency of hindered and unhindered monodimethylaminophenols in vegetable oils. The stabilization efficiency of TDAMP in vegetable oils is superior to the well-known TBHQ antioxidant for vegetable oils. The effectiveness of TDAMP is more pronounced for high oleic soybean oils, saturated synthetic esters and blends of vegetable oils with mineral oils.

Moreover, the synergistic effect of TDAMP in combination with other phenolic antioxidant is also somewhat surprising. In addition to adding antioxidants, the stabilized aminophenolic composition may further comprise at least one additive consisting of pour point depressant or colorant.

Though the carboxylic acid reacts with TDAMP and form salts, the retention of antioxidant behavior of carboxylic salts of TDAMP is unexpected. The additional benefits of TDAMP carboxylic acid salts would include low volatility, low corrosivity, high solubility, high temperature stability and low toxicity. Since the decomposition temperature of TDAMP is 152° C., the carboxylic acid salts of TDAMP could be used where high temperature performance is required.

The 2,4,6-tri(dimethylaminomethyl)phenol tricarboxylic acid salts could be useful as bio-based lubricating additive to lubricant base stock fluids and sulfur free fuels/diesel.

The use of vegetable oils as a lubricating fluid is limited due to its oxidative and hydrolytic instability. The addition of TDAMP or carboxylic acid salts of TDAMP to high oleic soybean oils could increase the use of these oils as lubricants.

Although the hydrolytic stability of the vegetable oils can be maximized by keeping the surroundings dry and minimizing the amount of free fatty acids, for some applications it is a challenge to minimize hydrolysis. For example, in transformer applications wherein the solid cellulose insulation paper in vegetable oil releases water and acids upon degradation and this water can hydrolyze the vegetable oils generating more acids and can impact the electrical performance of the transformers.

Though any saturated/unsaturated or branched/linear carboxylic acid can be used to react with TDAMP, the preferred carboxylic acid of the carboxylic acid salt of 2,4,6-tris(di-$C_1$-$C_6$-alkylaminomethyl) phenol is oleic acid, stearic acid, palmitic acid, myristic acid, lauric acid or tall oil. The amount of TDAMP or the carboxylic acid salt of TDAMP to be added to a base fluid depends on the end use application. The preferred amount for fuel application is in the range of 50 to 500 ppm, 200 to 10000 ppm for dielectric fluid use and about 2-3% for lubricant use.

The oxidative stability of the fluids can be measured via the oxidative stability index (OSI). Using test method AOCS 12b-92, the composition of the present invention preferably has an OSI of greater than about 20 hours at 130° C. and more preferably has an OSI of greater than about 100 hours at 130° C. The thermal stability of the stabilized aminophenolic composition is characterized by the extrapolated onset of thermal decomposition of the TAP in the stabilized aminophenolic composition occurring at a temperature greater than 153° C. as measured by TGA ASTM E2402-11.

TDAMP can be added to other antioxidants to provide a surprisingly synergistic effect of improved oxidative stability over TDAMP and other antioxidants separately. The other antioxidants are from about 0.01 to about 3 wt % of one or more antioxidants selected from the group consisting of butylated hydroxytoluene (BHT), butylated hydroxyanisole (BHA), t-butylhyroquinone (TBHQ), dimethylaminomethyl phenol (DAMP), 2,6-di-t-butyl-4-dimethylaminomethyl phenol (DBDAMP), 2,4-bis(dimethylaminomethyl) phenol (BDAMP), 1,6-hexamethylenebis(3,5-t-butyl-4-hydroxyhydrocinnamate) (HMBBHC) and combinations thereof.

The synergistic activity for oils that contain a mixture of additives can be calculated using the following formula reported in the literature: (ref: Rhet de Guzman, Haiying Tang, Steven Salley, K. Y. Simon Ng, H., *J. Amer. Oil Chem. Soc.* 86, 459-467 (2009)).

$$\text{Synergism, \%} = \frac{(IP_{mix} - IP_0) - [(P_1 + IP_0) + (P_2 - IP_0)]}{[(P_1 + IP_0) + (P_2 - IP_0)]} \times 100\%$$

Biodiesel, a fuel derived from vegetable oils, animal fats or used frying oils, largely consists of the mono-alkyl esters of the fatty acids comprising these feedstocks. Transesterifying an oil or fat with a mono-hydric alcohol usually methanol, leads to the corresponding mono-alkyl esters. One of the major technical issues facing biodiesel is its susceptibility to oxidation upon exposure to oxygen in ambient air. The nature and amount of the fatty acid chains found in biodiesel determine its oxidative stability. Oxidative stability affects fuel quality.

The biodiesel standard EN 14214 calls for determining oxidative stability at 110° C. with a minimum induction time of 6 h by the OSI method. This standard also specifies a maximum iodine value of 120 g iodine/100 g and maximum acid value 0.50 mg KOH/g.

As can be seen in the following examples, the oxidative stability time for HOME without any antioxidants exceeds the standard specification limits set for biodiesel on oxidative stability whereas SME without antioxidant fails to meet standard specifications. However, the addition of TDAMP to both SME and HOME increased the induction times dramatically.

In addition, TDAMP also neutralizes the free fatty acids present in the biodiesel and improves the hydrolytic stability as well.

Depending on the application, additional additives can be added to the compositions of the present invention. Examples of additive types include, but not limited to, are pour point depressants, metal passivators, anti-foaming agents, electrostatic agents, and lube enhancing additives.

TDAMP has a higher use temperature in vegetable oils. FIG. 1a shows the percent weight loss graph of the TGA for TDAMP as function of temperature. The graph shows the decomposition temperature of 152° C. Also, the end use temperature of TDAMP is unexpected extended to higher temperatures when mixed with high performance fluids. This provides a method of using the composition of the present invention as high performance fluid for industrial applications at a use temperature from about 100° C. to about 200° C., preferably from about 110° C. to about 180° C., and most preferably from about 120° C. to about 160° C. as a dielectric fluid, a lubricant fluid or a fuel fluid.

A stable composition comprising a $C_{12}$-$C_{22}$ carboxylic acid salt of 2,4,6-tris(di-$C_1$-$C_6$-alkylaminomethyl) phenol. Preferably the $C_{12}$-$C_{22}$ carboxylic acid is oleic acid, stearic acid or lauric acid and the 2,4,6-tris(di-$C_1$-$C_6$-alkylaminomethyl) phenol is 2,4,6-tris(dimethylaminomethyl) phenol (TDAMP). The carboxylic acid can react with one, two or all three reactive amine sites on the 2,4,6-tris(di-$C_1$-$C_6$-alkylaminomethyl) phenol. A single or mixture of carboxylic acids can be added to TDAMP to form the corresponding salt.

In another embodiment, the present invention is directed toward a stabilized dielectric fluid composition comprising: (a) at least one component selected from the group consisting of: (i) an ester based fluid comprising saturated and/or unsaturated esters of mono-, di-, tri- or polyhydroxyl alcohols; and (ii) a non-ester based fluid selected from the group consisting of mineral oil, silicones, poly(alpha olefins) and combinations thereof; and (b) at least one component selected from the group consisting of: (i) a 2,4,6-tris(di-$C_1$-$C_6$-alkylaminomethyl) phenol (TAP); and (ii) a salt of a at least one mono $C_{12}$-$C_{30}$ carboxylic fatty acid and a TAP having a molar ratio of up to 3 moles of mono $C_{12}$-$C_{30}$ carboxylic fatty acid per mole of TAP; and characterized in that the stabilized dielectric fluid composition has an oxidative stability index (OSI) of greater than about 20 hours at 130° C. as measured by AOCS 12b-92.

The antioxidant of the stabilized dielectric fluid composition is selected from the group consisting of: butylated hydroxytoluene (BHT), butylated hydroxyanisole (BHA), t-butylhyroquinone (TBHQ), dimethylaminomethyl phenol (DAMP), 2,6-di-t-butyl-4-dimethylaminomethyl phenol (DBDAMP), 2,4-bis(dimethylaminomethyl) phenol (BDAMP), and 1,6-hexamethylenebis(3,5-t-butyl-4-hydroxyhydrocinnamate) (HMBBHC).

Also, the present invention is directed toward a method for stabilizing a dielectric fluid composition comprising: mixing together at or above room temperature: (a) at least one component selected from the group consisting of: (i) an ester based fluid which comprises saturated and/or unsaturated esters of mono-, di-, tri- or polyhydroxyl alcohols; and (ii) a non-ester based fluid selected from the group consisting of mineral oil, silicones, poly(alpha olefins) and combinations thereof; and (b) at least one stabilizing additive selected from the group consisting of: (i) 2,4,6-tris(di-$C_1$-$C_6$-alkylaminomethyl) phenol (TAP); and (ii) a salt of a at least one mono $C_{12}$-$C_{30}$ carboxylic fatty acid and TAP having a molar ratio of up to 3 moles of mono $C_{12}$-$C_{30}$ carboxylic fatty acid per mole of TAP.

In another embodiment, the present invention is directed toward a stabilized lubricant fluid composition comprising: (a) at least one component selected from the group consisting of: (i) an ester based fluid comprising saturated and/or unsaturated esters of mono-, di-, tri- or polyhydroxyl alcohols; and (ii) a non-ester based fluid selected from the group consisting of mineral oil, silicones, poly(alpha olefins) and combinations thereof; (b) at least one component selected from the group consisting of: (i) 2,4,6-tris(di-$C_1$-$C_6$-alkylaminomethyl) phenol (TAP); and (ii) a salt of a at least one mono $C_{12}$-$C_{30}$ carboxylic fatty acid and TAP having a molar ratio of up to 3 moles of mono $C_{12}$-$C_{30}$ carboxylic fatty acid per mole of TAP; and (c) at least one additive selected from the group consisting of antioxidant, antiwear, antisieze and pour point depressant; and wherein the stabilized lubricant fluid composition has an oxidative stability index (OSI) of greater than about 20 hours at 130° C. as measured by AOCS 12b-92.

The ester based fluid is a blend of: (a) at least one ester based fluids selected from the group consisting of a vegetable oil, algae oil, animal fat and tall oil fatty acid ester having kinematic viscosity less than about 50 cSt at 40° C. as measured by ASTM D792-13; and (b) at least one ester based fluid selected from the group consisting of castor oil, hydrogenated castor oil and epoxidized triglyceride having kinematic viscosity greater than about 200 cSt at 40° C. as measured by ASTM D792-13; characterized in that the kinematic viscosity of the stabilized lubricant fluid composition is in the range of from about 40 cSt to less than about 200 cSt at 40° C. as measured by ASTM D792-13.

Also, the present invention is directed toward a method for stabilizing a lubricant fluid composition comprising the steps: mixing together at or above ambient temperature: (a) at least one component selected from the group consisting of: (i) an ester based fluid which comprises saturated and/or unsaturated esters of mono-, di-, tri- or polyhydroxyl alcohols; and (ii) a non-ester based fluid selected from the group consisting of mineral oil, silicones, poly(alpha olefins) and combinations thereof; and (b) at least one stabilizing additive selected from the group consisting of: (i) a 2,4,6-tris(di-$C_1$-$C_6$-alkylaminomethyl) phenol (TAP); and (ii) a salt of a at least one mono $C_{12}$-$C_{30}$ carboxylic fatty acid and TAP having a molar ratio of up to 3 moles of mono $C_{12}$-$C_{30}$ carboxylic fatty acid per mole of TAP.

In another embodiment, the present invention is directed toward an article or a machine having moving parts wherein the moving parts have surfaces in frictional contact with each other and/or with other adjoining surfaces, and wherein a stabilized lubricant fluid composition coats at least one of the surfaces. In another embodiment, the present invention is directed toward a process for operating this article comprising the step: operating the article at a temperature of greater than about 60° C.

In still another embodiment, the present invention is directed toward a stabilized biodiesel fluid composition comprising: (a) a methyl ester based fluid selected from the group consisting of vegetable oil, algae oil, animal fat, tall oil and combinations thereof; (b) optionally, a petrodiesel fluid; and (c) at least one component selected from the group consisting of: (i) 2,4,6-tris(di-$C_1$-$C_6$-alkylaminomethyl) phenol (TAP); and (ii) a salt of a at least one mono $C_{12}$-$C_{30}$ carboxylic fatty acid and TAP having a molar ratio of up to 3 moles of mono $C_{12}$-$C_{30}$ carboxylic fatty acid per mole of TAP; and wherein the composition is characterized in that the stabilized biodiesel fluid composition has an oxidative stability index (OSI) of greater than about 10 hours at 110° C. as measured by AOCS 12b-92.

Also, the present invention is directed toward a method for stabilizing a biodiesel fluid composition comprising the steps: mixing together at or above ambient temperature: (a) a methyl ester based fluid selected from the group consisting of vegetable oil, algae oil, animal fat, tall oil and combinations thereof; (b) optionally, a petrodiesel fluid; and (c) at least one component selected from the group consisting of: (i) 2,4,6-tris(di-$C_1$-$C_6$-alkylaminomethyl) phenol (TAP); and (ii) a salt mixture comprising at least one mono $C_{12}$-$C_{30}$ carboxylic fatty acid and a TAP, the salt mixture having a molar ratio of up to 3 moles of mono $C_{12}$-$C_{30}$ carboxylic fatty acid per mole of TAP.

EXAMPLES

Materials

All commercial materials were used as received unless otherwise indicated.

Refined, bleached, and deodorized high oleic soybean oil (RBD HOS oil, referred to herein as "HOS oil") containing triglycerides of the following fatty acids: palmitic acid (6.5 wt %), stearic acid (4.15 wt %), oleic acid (73.9 wt %), linoleic acid (8.77 wt %), and linolenic acid (2.94 wt %) was obtained according to U.S. Pat. No. 5,981,781. The oil was carefully dried by rotary evaporator at 90° C. for 4 hours with application of <100 mTorr vacuum.

Commodity soybean oil was obtained from Homestead Farms, Des Moines, Iowa.

DAMP, dimethylaminomethyl phenol, was obtained from Aldrich.

DBDAMP, 2,6-di-t-butyl-4-dimethylaminomethyl phenol, was obtained from Aldrich.

TDAMP, 2,4,6-tris(dimethylaminomethyl) phenol, was obtained from Aldrich.

TDAMP-TEH, 2-ethylhexanoic acid salt of TDAMP, was obtained as Ancamine® k 61B from Air Products.

ADPA, alkylated diphenylamine, was obtained as Irganox® L 57 from BASF.

BHT, butylated hydroxytoluene, was obtained from Aldrich.

TBHQ, t-butylhyroquinone, was obtained from Aldrich.

HMBBHC, 1,6-hexamethylenebis(3,5-t-butyl-4-hydroxyhydrocinnamate), was obtained as Irganox® 259 from BASF.

Lauric acid (>98%) and oleic acid (90%) were obtained from Aldrich.

TTCC, trimethylolpropane tricaprylic-caprate, was obtained as Hatcol 2938 from Chemtura.

Mineral oil was obtained as Luminol from Petro-Canada.

Kraft paper (7 mil) was obtained from Weidmann Electrical Technology Inc. (St. Johnsbury, Vt.) and cut into 2.5×12.7 cm pieces.

Example Preparation

Examples were prepared by using a vegetable oil based fluid alone or by blending a vegetable oil based fluid with one or more antioxidants.

Thermal Stability of TDAMP

The percent weight loss of TDAMP as a function of temperature (FIG. 1a) and as a function of time (FIG. 1b) at an isothermal temperature of 130° C. was studied by using a thermogravemetric analysis (TGA) under nitrogen atmosphere. For the purposes of this invention, TGA weight loss was determined according to ASTM D 3850-94, using a heating rate of 10° C./min, in air purge stream, with an appropriate flow rate of 0.8 mL/second.

The TGA was also measured using ASTM E2402-11.

Oxidative Stability of the Fluids

The Oxidation Stability Index (OSI) or also known as the Oil Stability Index determines the length of time before the start of rapid acceleration of oxidation and indicates the resistance to oxidation of the oil.

Oxidative stability of the fluids was tested according to the American Oil Chemists Society (AOCS) test method AOCS 12b-92 using the Oxidative Stability Instrument (Omnion, Inc, Rockland, Mass.) at either 110 or 130° C. Samples were run in duplicate and the average OSI induction period (IP) values for each fluid are reported.

Oxidative stability of the fluids was also tested according to the American Society for Testing and Materials (ASTM) test method ASTM D2440 method at Doble Lab. In this test method, the oil is oxidized at a bath temperature of 110° C. in the presence of a copper catalyst coil and bubbling oxygen for 72 h and 164 h, respectively.

Kinetic Viscosity

The Kinetic Viscosity was measured using ASTM D792-13 and was reported in cSt.

Example 1 and Comparative Examples A-C

The oxidative stability of high oleic soybean (HOS) oils with and without added antioxidants at a temperature of 110° C. was evaluated by OSI according to AOCS 12b-92. Examples were prepared using HOS oil without an antioxidant, Comparative Example A, blended separately with antioxidants, BHT, TBHQ and TDAMP, Comparative Examples B and C and Example 1, respectively. The OSI data are shown in Table 1.

TABLE 1

Oxidative Stability of HOS Oil at 110° C.

| Example | Antioxidant | Amount wt % | μmole/g | OSI at 110° C. (hours) |
|---|---|---|---|---|
| A | None | | | 24.6 |
| B | BHT | 0.1 | 4.54 | 35.9 |
|   |     | 0.2 | 9.08 | 38.2 |
| C | TBHQ | 0.1 | 6.02 | 65.2 |
|   |      | 0.2 | 12.04 | 81.4 |
| 1 | TDAMP | 0.1 | 3.66 | 93.7 |
|   |       | 0.2 | 7.55 | 143.8 |

Example 1 using added TDAMP demonstrates superior oxidative stability of HOS oil when compared to the absence of an antioxidant and well-known antioxidants.

Example 2 and Comparative Examples D-G

The oxidative stability of HOS oils with and without added antioxidants at a temperature of 130° C. was evaluated by OSI according to AOCS 12b-92. Examples were prepared using HOS oil without an antioxidant, Comparative Example D, blended with antioxidant ADPA, Comparative Example E, blended separately with aminophenol antioxidants, DAMP, DBDAMP and TDAMP, Comparative Examples F and G and Example 2, respectively. The OSI data are shown in Table 2 and FIG. 6.

TABLE 2

Oxidative Stability of HOS Oil at 130° C.

| Example | Antioxidant | Amount wt % | Amount μmole/g | OSI at 130° C. (hours) |
|---|---|---|---|---|
| D | None | | | 3.1 |
| E | ADPA | 0.2 | 3.14 | 1.7 |
| F | DAMP | 0.2 | 13.24 | 6.0 |
| G | DBDAMP | 0.2 | 7.60 | 9.4 |
| 2 | TDAMP | 0.2 | 7.54 | 29.9 |

Figure 6:
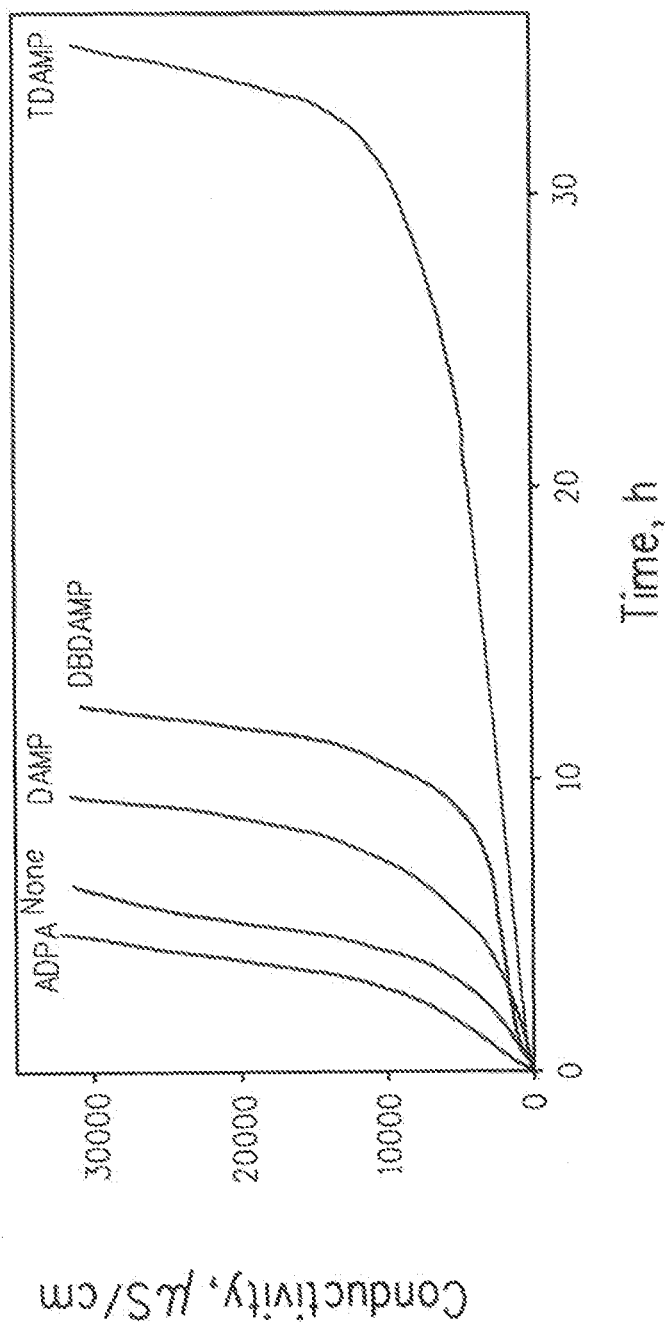
FIG. 6 is a graph of oxidative stability of high oleic soybean oil with various antioxidants at 130° C.

Example 2 and FIG. 6 using added TDAMP demonstrate superior oxidative stability of HOS oil when compared to the absence of an antioxidant and other aminophenols and alkylated diphenylamine. ADPA was found to be an ineffective (negative effect) antioxidant for HOS oil at this temperature.

Examples 3 and 4 and Comparative Examples H and I

The oxidative stability of commodity soybean oil was evaluated by combining TDAMP with another phenolic antioxidant HMBBHC (Irganox® 259) at a temperature of 130° C. was evaluated by OSI according to AOCS 12b-92. Examples were prepared using soybean oil without an antioxidant, Comparative Example H, blended with antioxidants, HMBBHC and TDAMP separately, Comparative Example I and Example 3 and blended with HMBBHC and TDAMP together, Example 4. The OSI data are shown in Table 3.

TABLE 3

Synergistic Effects on Oxidative Stability of Soybean Oil

| Example | HMBBHC (wt %) | TDAMP (wt %) | OSI at 130° C. (hours) | Synergism (%) |
|---|---|---|---|---|
| H | 0 | 0 | 1.0 | 27.0 |
| I | 0.9 | 0 | 3.0 | |
| 3 | 0 | 0.2 | 6.95 | |
| 4 | 0.9 | 0.2 | 11.1 | |

Table 3 shows the positive synergistic effect of the oxidative stability of soybean oil in the presence of TDAMP in combination with HMBBHC over the oxidative stability of either antioxidant alone.

Examples 5 and 6 and Comparative Examples J and K

The oxidative stability of HOS oil was evaluated by combining TDAMP with the phenolic antioxidant HMBBHC at a temperature of 130° C. was evaluated by OSI according to AOCS 12b-92. Examples were prepared using HOS oil blended without an antioxidant, Comparative Example J, blended with antioxidants, HMBBHC and TDAMP separately, Comparative Example K and Example 5 and blended with HMBBHC and TDAMP together, Example 6. The OSI data are shown in Table 4.

TABLE 4

Synergistic Effects on Oxidative Stability of HOS Oil

| Example | HMBBHC (wt %) | TDAMP (wt %) | OSI at 130° C. (hours) | Synergism (%) |
|---|---|---|---|---|
| J | 0 | 0 | 3.1 | 27.8 |
| K | 0.9 | 0 | 19.9 | |
| 5 | 0 | 0.2 | 29.8 | |
| 6 | 0.9 | 0.2 | 58.7 | |

Table 4 shows the synergistic effect of the oxidative stability of HOS oil in the presence of TDAMP in combination with HMBBHC over the oxidative stability of either antioxidant alone.

Examples 7 and 8 and Comparative Examples L and M

The oxidative stability of HOS oil was evaluated by combining TDAMP with a mixture of antioxidants HMBBHC and TBHQ at a temperature of 130° C. was evaluated by OSI according to AOCS 12b-92. Examples were prepared using HOS oil without an antioxidant, Comparative Example L, blended with antioxidants, HMBBHC and TBHQ, Comparative Example M, blended with TDAMP, Example 7 and blended with HMBBHC, TBHQ and TDAMP together, Example 8. The OSI data are shown in Table 5.

TABLE 5

Synergistic Effects on Oxidative Stability of HOS Oil

| Example | HMBBHC (wt %) | TBHQ (wt %) | TDAMP (wt %) | OSI at 130° C. (hours) | Synergism (%) |
|---|---|---|---|---|---|
| L | 0 | 0 | 0 | 3.1 | 38.7 |
| M | 0.9 | 0.3 | 0 | 42.1 | |
| 7 | 0 | 0 | 0.2 | 29.9 | |
| 8 | 0.9 | 0.3 | 0.2 | 94.7 | |

Table 5 shows the synergistic effect of the oxidative stability of HOS oil in the presence of TDAMP in combination with HMBBHC and TBHQ over the oxidative stability of antioxidant combinations without TDAMP.

Comparative Examples N-Q

The oxidative stability of HOS oil was evaluated by combining similar aminophenol additives to TDAMP with HMBBHC and TBHQ at a temperature of 130° C. was evaluated by OSI according to AOCS 12b-92. Examples were prepared using HOS oil blended with antioxidants, HMBBHC and TBHQ combined, Comparative Example N, blended with HMBBHC and TBHQ combined with DAMP, DBDAMP and ADPA separately, Comparative Examples O-Q. The OSI data are shown in Table 6.

TABLE 6

Synergistic Effects on Oxidative Stability of HOS Oil

| Example | HMBBHC (wt %) | TBHQ (wt %) | Antioxidant (wt %) | OSI at 130° C. (hours) |
|---|---|---|---|---|
| N | 0.9 | 0.3 | 0 | 42.1 |
| O | 0.9 | 0.3 | DAMP 0.2 | 41.3 |
| P | 0.9 | 0.3 | DBDAMP 0.2 | 39.8 |
| Q | 0.9 | 0.3 | ADPA 0.2 | 40.7 |

None of the Comparative Examples of Table 6 show synergistic effect on oxidative stability. Only TDAMP has been shown to produce a synergistic effect on oxidative stability in the presence of other antioxidants.

Example 9 and Comparative Examples R and S

The oxidative stability of HOS oil was evaluated by combining TDAMP with other antioxidants TBHQ and HMBBHC at a temperature of 110° C. was evaluated by OSI according to ASTM D2440. Examples were prepared using HOS oil blended without an antioxidant, Comparative Example R, blended with antioxidants, HMBBHC and TBHQ, Comparative Example S and blended with HMBBHC, TBHQ and TDAMP together, Example 9. The OSI data are shown in Table 7.

TABLE 7

Synergistic Effects on Oxidative Stability of HOS Oil

| Example | Antioxidants | OSI at 110° C. After 72 h | | OSI at 110° C. After 164 h | |
|---|---|---|---|---|---|
| | | % Sludge | Neut. No. mg KOH/g | % Sludge | Neut. No. mg KOH/g |
| R | none | 7.5 | 19.2 | Polymerized | |
| S | 0.3% TBHQ 0.9% HMBBHC | 0.05 | 0.34 | 13.5 | 20.1 |
| 9 | 0.3% TBHQ 0.9% HMBBHC 0.2% TDAMP | 0.14 | 0.30 | 0.26 | 0.44 |

Table 7 shows the synergistic effect of the oxidative stability of HOS oil in the presence of TDAMP in combination with TBHQ and HMBBHC over the oxidative stability of antioxidant combinations without TDAMP.

Hydrolytic Stability of the Vegetable Oils

The hydrolytic stability of the commodity soybean oil and high oleic soybean oil in the presence of antioxidants was tested by adding 2000 ppm of water to the oils. The glass containers were dried at 550° C. for 24 hours, cooled to room temperature, loaded with the oils separately, and then sealed in a nitrogen atmosphere. Each tube was filled with about 84 cm³ fluid and the head space was about 30-39 cm³. The test tubes containing the oils were placed into an oven maintained at 130° C. for a period of 1 to 2 weeks.

Examples 10-12 and Comparative Examples T-V

Examples were prepared using soybean oil without an antioxidant, Comparative Example T and blended with TDAMP without additional antioxidants, Example 10. Additional examples were prepared using HOS oil without an antioxidant, Comparative Example U, blended with antioxidants, HMBBHC and TBHQ, Comparative Example V, blended with TDAMP without additional antioxidants, Example 11 and blended with HMBBHC, TBHQ and TDAMP together, Example 12. The fatty acid content in the oils was determined using proton NMR and the percent oil hydrolysis was reported in Table 8.

TABLE 8

Hydrolytic Stability of Soybean Oils

| Example | Oil | Antioxidants | % Oil Hydrolysis | |
|---|---|---|---|---|
| | | | 1 week | 2 weeks |
| T | Soybean | none | 0.69 | 1.07 |
| 10 | Soybean | 0.2% TDAMP | 0.58 | 0.89 |
| U | HOS | none | 0.55 | 0.96 |
| V | HOS | 0.3% TBHQ + 0.9% HMBBHC | 1.84 | 3.98 |
| 11 | HOS | 0.2% TDAMP | 0.32 | 0.79 |
| 12 | HOS | 0.3% TBHQ + 0.9% HMBBHC + 0.2% TDAMP | 1.11 | 0.95 |

Both soybean and HOS oils undergo hydrolysis with time in the presence of moisture at elevated temperatures. The phenolic antioxidants increase the rate of hydrolysis of the oils which is undesirable. When TDAMP was added by itself or along with phenolic antioxidants, the hydrolytic stability of the oils was improved.

Aging Stability

Aging studies were performed by immersing solid insulation Kraft paper with the fluids at 110° C., for 2 weeks (336 hours), 6 weeks (1008 hours) and 12 weeks (2016 hours). The paper samples, the glass test tubes were carefully dried prior to the tests. The glass containers were dried at 550° C. for 24 hours, cooled to room temperature, loaded with the paper and the fluid, and then sealed in a nitrogen atmosphere. Each tube was filled with about 84 cm³ fluid, the average paper weight was 1.7 g, and the head space was about 30-39 cm³. The test tubes containing the paper samples and oil were placed into an oven maintained at 110° C. After the desired aging time, the tests tubes were removed from the oven and cooled to room temperature. The solid insulation was removed from the oil and the fatty acid content in the oils was analyzed by NMR spectroscopy and the percentage of HOS oil hydrolysis was reported.

Example 13 and Comparative Examples W and X

Examples were prepared using HOS oil blended without an antioxidant, Comparative Example W, with TBHQ and HMBBHC, Comparative Example X, and with TBHQ, HMBBHC and TDAMP, Example 13. The fatty acid content in the oils was determined using proton NMR and the percent HOS oil hydrolysis was reported in Table 9.

TABLE 9

Aging Stability of HOS Oil

| Example | Antioxidants | % HOS Oil Hydrolysis | | |
|---|---|---|---|---|
| | | 2 weeks | 6 weeks | 12 weeks |
| W | none | 0.20 | 0.23 | 0.98 |
| X | 0.3% TBHQ 0.9% HMBBHC | 0.39 | 0.77 | 1.34 |
| 13 | 0.3% TBHQ 0.9% HMBBHC 0.2% TDAMP | 0.31 | 0.63 | 0.71 |

Though the phenolic antioxidants of Comparative Example X enhance the oxidative stability of the natural esters, they decrease the hydrolytic stability. The hydrolytic stability of the HOS oil is better when TDAMP was added to other phenolic antioxidants of Example 13.

Carboxylic Acid Salts of TDAMP

Carboxylic acid salts of TDAMP were prepared and evaluated their thermal stabilities using TGA. FIGS. 2-4 correspond to the percent weight loss of 2-ethylhexanoic acid salt, lauric acid salt and oleic acid salt of TDAMP as a function of temperature respectively. FIG. 5 corresponds to the percent weight loss of oleic acid salt of TDAMP as a function of time at constant temperature of 130° C. The Table 10 below compares the percent residual weight left (total weight loss) of TDAMP and its oleic acid salt at constant temperature of 130° C. under nitrogen atmosphere and at given time.

TABLE 10

Weight Loss of TDAMP

| | Time | Residual weight |
|---|---|---|
| TDAMP | 1.5 h | 2.4% |
| TDAMP/Oleic acid salt | 4.0 h | 85.8% |

The above salts were added separately to HOS oil and the oxidative stability of the HOS oil at 130° C. was evaluated by OSI according to AOCS 12b-92 and reported in Table 11.

Examples 14 and 15

Examples 14 and 15 were prepared using HOS oil blended separately with TDAMP and TDAMP-TEH, respectively. The oxidative stability was measured and the OSI data are shown in Table 11.

Example 16

The oleic acid salt of TDAMP was prepared by mixing 3.78 mmoles of TDAMP and 10.46 mmoles of oleic acid in a 25 mL reactor at 75° C. for 1 h and then the reaction mixture was cooled to room temperature while stirring was continued for 24 h. Then the salt was blended with HOS oil. The oxidative stability was measured and the OSI data are shown in Table 11.

Examples 17

The lauric acid salts of TDAMP were prepared by mixing 3.78 mmoles of TDAMP and separately 11.25, 7.6 and 3.78 mmoles of lauric acid in a 25 mL reactor at 75° C. for 1 h and then the reaction mixture was cooled to room temperature while stirring was continued for 24 h. Then the salt was blended with HOS oil to produce Examples 17-19, respectively. The oxidative stability was measured and the OSI data are shown in Table 11.

TABLE 11

Oxidative Stability of HOS Oil with
Carboxylic Acid Salts of TDAMP

| | | Amount | | OSI at 130° C. |
|---|---|---|---|---|
| Example | Antioxidant | (wt %) | µmole/g | (hours) |
| 14 | TDAMP | 0.2 | 7.5 | 29.9 |
| 15 | TDAMP-2-ethylhexanoic acid | 0.51 | 7.5 | 28.4 |
| 16 | TDAMP-oleic acid | 0.83 | 7.5 | 26.4 |
| 17 | TDAMP-lauric acid | 0.65 | 7.5 | 30.2 |

The oxidative stability of each carboxylic acid salt of aminophenol in HOS oil inhibited oxidation of HOS oil as well as TDAMP alone.

Oxidative Stability of Other Fluids and Blends

Examples 20 and 21 and Comparative Examples Y and Z

The oxidative stability of a synthetic saturated polyol ester, trimethylolpropan tricaprylate-caprate (TTCC) was evaluated, Comparative Example Y, and in the presence of 250 ppm of TDAMP, Example 20. Two blends were prepared by mixing 80% commodity soybean oil, 20% mineral oil and 0.3% BHT. One blend was measured for oxidative stability, Comparative Example Z, and to the other blend 0.2% TDAMP was added, Example 21, and measured for oxidative stability at 130° C. was evaluated by OSI according to AOCS 12b-92. The OSI data are shown in Table 12.

TABLE 12

Oxidative Stability

| Example | Fluid | TDAMP (wt %) | OSI at 130° C. (hours) |
|---|---|---|---|
| Y | TTCC | 0 | 14.1 |
| 20 | TTCC | 0.025 | 123 |
| Z | 80/20 Soybean/mineral oil | 0.0 | 3.4 |
| 21 | 80/20 Soybean/mineral oil | 0.2 | 15.4 |

Table 12 shows the strong oxidation inhibition effect of TDAMP on other fluids and blends as well.

Stability of Biodiesel

Example 22 and Comparative Example AA

Soybean methyl ester (SME) was prepared by mixing 920 g commodity soybean oil and 200 g methanol into a 2 L four neck glass round bottom flask fitted with mechanical stirrer and the reactor was flushed with dry nitrogen gas and 11.7 g sodium hydroxide solution (50 wt %) was added. The reaction temperature was raised to 60° C. while stirring in a nitrogen flow and the reaction was continued for 4 h. After reaction, the obtained product was transferred into separating funnel and allowed to separate. The glycerol part was discarded and the top methyl ester was dried using rotary evaporator to remove any unreacted methanol. The obtained product was mixed with water and the aqueous layer was removed after separation. The later step was repeated twice. The product was again dried using a rotary evaporator at 80° C. for 1 h at about 400 mTorr. The obtained SME product, Comparative Example AA, was characterized using proton NMR. Example 22 was prepared by mixing 100 g of SME obtained in Example 20 with 0.2 g of TDAMP and the product was thoroughly homogenized for 12 h. The oxidation stability index was measured at 110° C. by OSI according to AOCS 12b-92 and reported in Table 13.

Example 23 and Comparative Example BB

High oleic soybean methyl ester (HOME) was prepared as described in Comparative Example AA by replacing reactant commodity soybean oil with high oleic soybean oil. The obtained HOME product was characterized using proton NMR. Example 23 was prepared by mixing 100 g of SME obtained in Example 20 with 0.2 g of TDAMP and the product was thoroughly homogenized for 12 h. The oxidation stability index was measured by OSI according to AOCS 12b-92 and reported in Table 13.

TABLE 13

Oxidative Stability of SME & HOME at 110° C.

| Example | Biodiesel | Iodine Value (g iodine/100 g) | TDAMP (wt %) | OSI at 110° C. (hours) |
|---|---|---|---|---|
| AA | SME | 130 | 0 | 1.4 |
| 22 | SME | | 0.2 | 12.2 |
| BB | HOME | 86 | 0 | 10.8 |
| 23 | HOME | | 0.2 | >43 |

Table 13 indicates that the presence of TDAMP, Examples 22 and 23, improve the OSI over the fluids without TDAMP, Comparative Examples AA and BB.

Stability of Lube Oils

Examples 24-28 and Comparative Examples CC-DD

Table 14 demonstrates that high performance lube base oils can be formulated by blending a low viscosity and high viscosity index (VI) fluid, high oleic soybean oil, with a high viscosity and low viscosity index fluid, castor oil, with 1 wt % TDAMP-oleic acid salt.

TABLE 14

Stability of Lube Oils

| Example | HOS/Castor (wt %) | TDAMP-Oleic acid salt (wt %) | Kinematic viscosity, cSt 40° C./100° C. | | VI | OSI at 130° C., (h) |
|---|---|---|---|---|---|---|
| CC | 100/0 | 0 | 35.3 | 7.2 | | 4.5 |
| DD | 0/100 | 0 | 256 | 19.33 | 85 | 14.0 |
| 24 | 97/3 | 1 | 41.0 | 8.57 | 194 | 34.4 |
| 25 | 86/14 | 1 | 46.6 | 8.96 | 176 | 32.5 |
| 26 | 70/30 | 1 | 60.4 | 10.08 | 154 | 38.7 |
| 27 | 45/55 | 1 | 95.6 | 12.20 | 120 | 35.0 |
| 28 | 20/80 | 1 | 160.8 | 15.44 | 97 | 34.5 |

Improved Stability of Insulation Paper in Stable Dielectric Fluid

Examples 29-30 and Comparative Examples EE-FF

A blend fluid composition was prepared by mixing commodity soybean oil (78.08%), mineral oil (19.52%, Luminol®), a mixture of antioxidants (0.3% BHT, 0.9% Irganox® 259, and 0.2% TDAMP), and a pour point depressant (1.0%, Viscoplex® 10-310). The stability of the thermally upgraded Kraft (TUK) insulation paper in this fluid blend was evaluated and compared with a commercial vegetable oil based dielectric fluid (FR3™) in an accelerated aging testing conducted at 180° C. over a period of time. The thermal aging sample cells were set-up according to the IEEE standard C57.100.2011 using TUK paper insulation. The headspace for each sample was purged with nitrogen. Four sample cells were used for each dielectric fluid since one cell was required for each test period of 7, 14, 49 and 70 days. When the sample aging time was reached for each cell, the contents of the cell (insulation and fluid) were tested. The tensile strength of the insulation paper was measured and the % tensile strength retention was calculated and was reported in Table 15. The aged fluid properties are reported in Table 16.

The higher percent tensile strength retention of insulation paper in the blend fluid compared to the paper in the commercial fluid suggesting the insulation paper is more stable in the blend fluid than in the commercial oil. This higher stability of the insulation paper in blend fluid may be due to higher stability of the blend fluid (less change in viscosity and less acid generation), and better heat transfer efficiency due to lower viscosity (Table 16).

TABLE 15

Tensile Strength Retention of TUK Insulation Paper in Fluids at 180° C.

| | | Tensile strength retention (%) of Insulation Paper | | | | |
|---|---|---|---|---|---|---|
| Example | Dielectric Fluid | 336 h | 672 h | 1008 h | 1176 h | 1680 h |
| EE | Commercial vegetable oil based | 40.8 | 26.6 | 23.2 | — | 20.3 |
| 29 | Blend fluid composition | 65.5 | 34.4 | — | 33.7 | 25.7 |

TABLE 16

Properties of Aged Fluids

| Example | Dielectric Fluid | Aged Time (h) | Viscosity @ 40° C. (cSt) | Neutralization Number (mg/KOH) |
|---|---|---|---|---|
| FF | Commercial vegetable oil based | 0 | 32.5 | 0.03 |
| | | 336 | 34.4 | 2.41 |
| | | 672 | 35.2 | 8.73 |
| | | 1008 | 36.5 | 12.23 |
| | | 1680 | 38.1 | 19.35 |
| 30 | Blend fluid composition | 0 | 27.3 | 0.03 |
| | | 336 | 27.5 | 1.35 |
| | | 672 | 27.0 | 2.75 |
| | | 1008 | 29.9 | 6.11 |
| | | 1680 | 28.1 | 5.67 |

What is claimed is:

1. A stabilized lubricant fluid composition comprising:
   (a) at least one component selected from the group consisting of:
      (i) an ester based fluid comprising saturated and/or unsaturated esters of mono-, di-, tri- or polyhydroxyl alcohols; and
      (ii) a non-ester based fluid selected from the group consisting of mineral oil, silicones, poly(alpha olefins) and combinations thereof;
   (b) at least one component selected from the group consisting of:
      (i) 2,4,6-tris(di-$C_1$-$C_6$-alkylaminomethyl) phenol (TAP); and
      (ii) a salt of a at least one mono $C_{12}$-$C_{30}$ carboxylic fatty acid and TAP having a molar ratio of up to 3 moles of mono $C_{12}$-$C_{30}$ carboxylic fatty acid per mole of TAP; and
   (c) at least one additive selected from the group consisting of antioxidant, antiwear, antisieze and pour point depressant; and
   wherein the stabilized lubricant fluid composition has an oxidative stability index (OSI) of greater than about 20 hours at 130° C. as measured by AOCS 12b-92.

2. The stabilized lubricant fluid composition of claim 1, wherein the ester based fluid is selected from the group consisting of vegetable oil, algae oil, animal fat, tall oil fatty acid esters and combinations thereof.

3. The stabilized lubricant fluid composition of claim 2, wherein the vegetable oil is selected from the group consisting of: soybean oil, rapeseed oil, sunflower oil, safflower oil, castor oil, palm oil, palm kernel oil, coconut oil, camelina oil, olive oil, cottonseed oil, grapeseed oil and combinations thereof.

4. The stabilized lubricant fluid composition of claim 2, wherein the vegetable oil comprises at least about 75 wt % of a high oleic acid triglyceride composition.

5. The stabilized lubricant fluid composition of claim 1, wherein the ester based fluid comprises free fatty acids up to about 1 wt %.

6. The stabilized lubricant fluid composition of claim 1, wherein the TAP is 2,4,6-tris(dimethylaminomethyl) phenol (TDAMP).

7. The stabilized lubricant fluid composition of claim 1, wherein the mono $C_{12}$-$C_{30}$ carboxylic fatty acid is selected from the group consisting of oleic acid, stearic acid, palmitic acid, myristic acid, lauric acid and tall oil.

8. The stabilized lubricant fluid composition of claim 1, wherein the salt is formed from oleic acid and 2,4,6-tris (dimethylaminomethyl) phenol (TDAMP).

9. The stabilized lubricant fluid composition of claim 1, wherein the stabilized lubricant fluid composition has an oxidative stability index (OSI) of greater than about 100 hours at 130° C. as measured by AOCS 12b-92.

10. A method for stabilizing a lubricant fluid composition comprising the steps:
   mixing together at or above ambient temperature:
   (a) at least one component selected from the group consisting of:
      (i) an ester based fluid which comprises saturated and/or unsaturated esters of mono-, di-, tri- or polyhydroxyl alcohols; and
      (ii) a non-ester based fluid selected from the group consisting of mineral oil, silicones, poly(alpha olefins) and combinations thereof; and
   (b) at least one stabilizing additive selected from the group consisting of:
      (i) a 2,4,6-tris(di-$C_1$-$C_6$-alkylaminomethyl) phenol (TAP); and
      (ii) a salt of a at least one mono $C_{12}$-$C_{30}$ carboxylic fatty acid and TAP having a molar ratio of up to 3 moles of mono $C_{12}$-$C_{30}$ carboxylic fatty acid per mole of TAP.

11. The stabilized lubricant fluid composition of claim 1, wherein the ester based fluid is a blend of:
   (a) at least one ester based fluids selected from the group consisting of a vegetable oil, algae oil, animal fat and tall oil fatty acid ester having kinematic viscosity less than about 50 cSt at 40° C. as measured by ASTM D792-13; and
   (b) at least one ester based fluid selected from the group consisting of castor oil, hydrogenated castor oil and epoxidized triglyceride having kinematic viscosity greater than about 200 cSt at 40° C. as measured by ASTM D792-13;
   characterized in that the kinematic viscosity of the stabilized lubricant fluid composition is in the range of from about 40 cSt to less than about 200 cSt at 40° C. as measured by ASTM D792-13.

12. An article or a machine having moving parts wherein the moving parts have surfaces in frictional contact with each other and/or with other adjoining surfaces, and wherein a stabilized lubricant fluid composition of claim 1 coats at least one of the surfaces.

13. A process for operating an article of claim 12 comprising the steps: operating the article at a temperature of greater than about 60° C.

* * * * *